United States Patent
Ribich

(10) Patent No.: US 9,335,796 B2
(45) Date of Patent: May 10, 2016

(54) METHOD AND APPARATUS FOR A PASSIVE AVIONICS DATA TRANSFER DEVICE FOR USE WITH COTS TABLET EQUIPMENT DEPLOYED AS CLASS I OR II ELECTRONIC FLIGHT BAG SYSTEMS

(71) Applicant: Richard Luke Ribich, Maumelle, AR (US)

(72) Inventor: Richard Luke Ribich, Maumelle, AR (US)

(73) Assignee: ASIG, LLC, Little Rock, AR (US)

( * ) Notice: Subject to any disclaimer, the term of this patent is extended or adjusted under 35 U.S.C. 154(b) by 0 days.

(21) Appl. No.: 13/791,249

(22) Filed: Mar. 8, 2013

(65) Prior Publication Data

US 2014/0222254 A1 Aug. 7, 2014

Related U.S. Application Data

(60) Provisional application No. 61/608,291, filed on Mar. 8, 2012.

(51) Int. Cl.
| | |
|---|---|
| *G01C 23/00* | (2006.01) |
| *G06F 1/16* | (2006.01) |
| *G06F 9/44* | (2006.01) |
| *F16M 11/04* | (2006.01) |
| *F16M 11/14* | (2006.01) |
| *F16M 13/00* | (2006.01) |
| *F16M 13/02* | (2006.01) |
| *B64D 45/00* | (2006.01) |

(52) U.S. Cl.
CPC ............ *G06F 1/1675* (2013.01); *F16M 11/041* (2013.01); *F16M 11/14* (2013.01); *F16M 13/00* (2013.01); *F16M 13/022* (2013.01); *G06F 1/1632* (2013.01); *G06F 8/00* (2013.01); *B64D 2045/0075* (2013.01)

(58) Field of Classification Search
CPC ........................................................ G01C 23/00
USPC ................... 701/3, 4; 248/122.1, 218.4, 689; 345/173
See application file for complete search history.

(56) References Cited

U.S. PATENT DOCUMENTS

| | | | | |
|---|---|---|---|---|
| 6,588,719 B1 * | 7/2003 | Tubach | ................ | F16C 11/106 248/282.1 |
| 7,686,250 B2 * | 3/2010 | Fortes | ................... | B64D 43/00 211/115 |
| 8,633,913 B1 * | 1/2014 | Raghu | ................... | G08G 5/0021 340/945 |
| 2008/0154446 A1 * | 6/2008 | Rui | ....................... | B64D 43/00 701/3 |
| 2008/0195309 A1 * | 8/2008 | Prinzel, III | ............ | G01C 23/00 701/532 |

(Continued)

*Primary Examiner* — Thomas G Black
*Assistant Examiner* — Wae Louie
(74) *Attorney, Agent, or Firm* — Corbitt Law Firm; Chris P. Corbitt

(57) ABSTRACT

The present disclosure provides an aerospace grade data conversion apparatus. The data conversion apparatus includes an avionics interface module for: collecting data outputs from a plurality of analog and digital avionics and electrical data sources; aligning digital data respectively output from the plurality of digital data sources; and commingling the digital data in order to generate a data sequence interpreted by a receiving device, the receiving device including an electronic tablet. The present disclosure also provides a software developer's kit. The software developer's kit includes a library configured to allow application software developers to utilize digital data output from an avionics interface module. The present disclosure further includes a mounting system. The mounting system includes one or more assemblies for securing an electronic flight bag device to an aircraft, wherein the electronic flight bag includes an electronic tablet.

25 Claims, 44 Drawing Sheets

(56) References Cited

U.S. PATENT DOCUMENTS

| | | | |
|---|---|---|---|
| 2008/0208399 A1* | 8/2008 | Pham | G01C 23/00 701/4 |
| 2011/0240830 A1* | 10/2011 | Alemozafar | F16M 13/00 248/689 |
| 2012/0241567 A1* | 9/2012 | Gillespie-Brown | B60R 11/00 248/122.1 |
| 2012/0273630 A1* | 11/2012 | Gillespie-Brown | F16M 11/041 248/122.1 |
| 2013/0109253 A1* | 5/2013 | Gammon | F16M 11/10 439/883 |
| 2013/0221174 A1* | 8/2013 | Sapper | F16M 11/2021 248/218.4 |
| 2014/0222254 A1* | 8/2014 | Ribich | G06F 8/00 701/3 |

\* cited by examiner

METHOD AND APPARATUS FOR A PASSIVE AVIONICS DATA TRANSFER DEVICE FOR USE WITH COTS TABLET EQUIPMENT DEPLOYED AS CLASS I OR II ELECTRONIC FLIGHT BAG SYSTEMS

CROSS-REFERENCE TO RELATED APPLICATION

Provisional Application No. 61/608,291

FEDERALLY SPONSORED RESEARCH

None

SEQUENCE LISTING

None

TECHNICAL FIELD

The present disclosure generally relates to avionics data collection, and more particular, to a method and apparatus of collecting and utilizing data from an aircraft.

BACKGROUND

In the field of avionics, pilots have traditionally relied on flight bags to help them navigate the aircraft they operate. These flight bags may contain flight-related documents such as aircraft operation manuals, navigation charts, company policies, checklists, and information related to the trip, etc. The flight bags are typically heavy and may weigh as much as forty or fifty pounds. Such heavy weight of the flight bags makes them inconvenient for pilots or flight crew, who has to carry these heavy bags with them to the cockpit of an aircraft on every trip they take.

In recent years, the rapid advancement in computer and networking technologies has led to the development of electronic flight bags (EFB). These electronic flight bags include electronic devices that store the information contained in a traditional flight bag in a digital format. However, to ensure the aircraft's operational safety, governmental rules and regulations have placed stringent requirements on the electronic flight bags. For example, there are stringent requirements regarding the way in which power is supplied to an electronic flight bag. Existing electronic flight bags have not adequately addressed these issues.

Therefore, while existing electronic flight bags have been generally adequate for their intended purposes, they have not been entirely satisfactory in every aspect.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
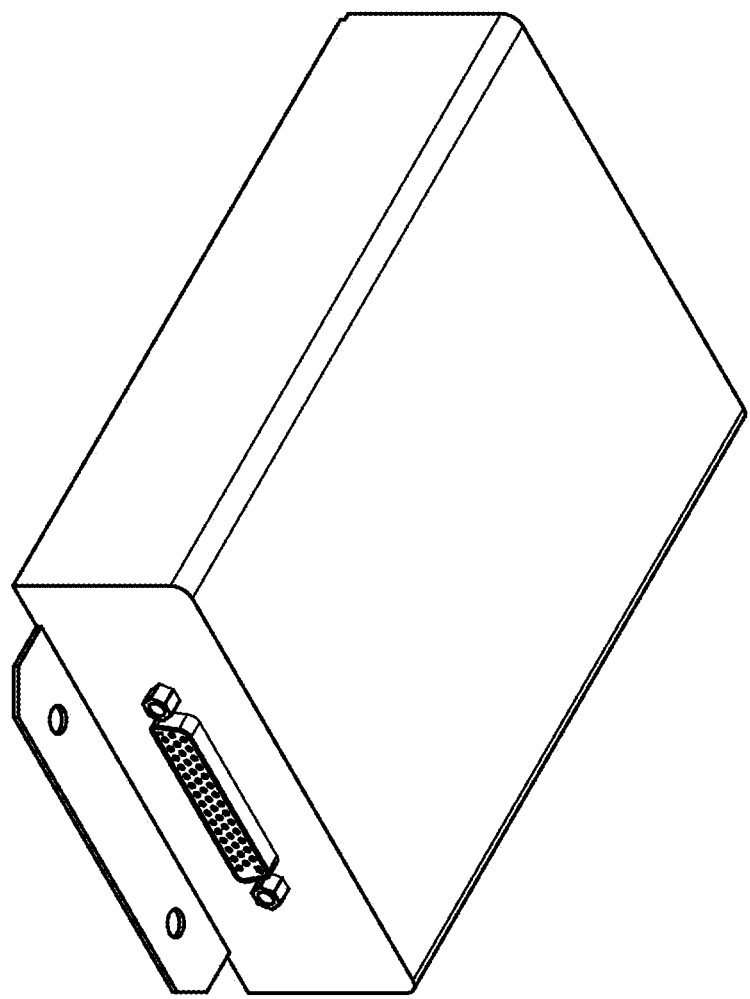
FIG. 1 is an isometric drawing of an avionics interface module according to an embodiment of the present disclosure.

It is to be understood that the following disclosure provides many different embodiments, or examples, for implementing different features of the invention. Specific examples of components and arrangements are described below to simplify the present disclosure. These are, of course, merely examples and are not intended to be limiting. Various features may be arbitrarily drawn in different scales for simplicity and clarity.

Information technology has made great advances throughout the avionics industry, but this progression has been slow to make its way into the aircraft cockpit. Due to the demanding environmental conditions in modern cockpits, the lengthy certification and acquisition hurdles and the costs associated with the redesign of instrument panels, cockpit improvements have been few and very far between. Many cockpits still contain the original electromechanical (EM) gauges and cathode ray tubes (CRTs) that were part of the aircrafts' original design. In certain cases, instead of making the decision to modernize the aircraft cockpits, the older, less reliable displays are replaced at a high cost, in the amount of millions of dollars per aircraft.

In recent years, Electronic Flight Bags (EFB) have been proposed and implemented to replace the traditional flight bags. These electronic flight bags include electronic devices that can digitally store the information contained in a traditional flight bag. Since a large amount of information can be stored in a relatively small electronic device, the electronic flight bags weigh much less than traditional flight bags containing paper documents. The elimination of the paper documents may also result in cost savings. In addition, it may be easier for an operator to manage and manipulate flight information electronically using the electronic flight bag.

The present disclosure involves applying Commercial off the Shelf (COTS) tablet equipment (for example, the Apple® iPad™) to a qualified Class 1/2 hybrid EFB system. One aspect of the present disclosure pertains to a tablet EFB system installation (in an aircraft) that includes an adaptable Class 1/2 mount solution, power conditioning options and available passive data interface functionality akin to a Class 3 integration. Another aspect of the present disclosure pertains to a software tool for the tablet EFB system. The software tool is specifically designed to support flight planners, enhance pilot situational awareness and improve flight debriefing and reporting accuracy and speed. When implemented, the designs of the present disclosure will significantly advance the development in the areas of advanced user interfaces; flight planning functionality, airframe integration and user deploy ability of an improved man-portable COTS Class 2 EFB solution based on a commercially available tablet.

The present disclosure will also make highly integrated planning mechanisms available for benchmarking of flight performance real-time to aircraft operators supporting their situational awareness as well as precision of flight performance. The designs of the present disclosure also enable pilots and electronic planning resources to communicate seamlessly. Through device hardening with an In-Case mount accessory and the man-portable mounted/dismounted optional configuration, acquisition costs for a hybrid system are minimal, and survivability of the device becomes a moot point over other enduring benefits.

An initial reason for development of EFB technology is to eliminate the cost of paper documents from the cockpit. An increasing number of constantly changing documents are brought into or stored in the cockpit. These documents are comprised of aeronautical charts and approach plates, aircraft specific flight manuals and checklists, general operating procedures, and in-flight guides (IFGs); however, all of these documents already exist in an electronic format and could be more easily be displayed electronically to the pilot or crewmember than through paper medium.

Utilizing the EFB to store and display technical orders will save a considerable amount of the time and man-hours currently spent on reproduction, and distribution to produce a better end result. If data were sent electronically, all of it could be updated more rapidly at minimal costs. An EFB is an electronic version of a pilot's flight bag. A flight bag is a physical device that carries the printed documentation pilots must have available to them during the course of the flight, such as flight manuals, operation manuals, and approach plates. This "bag" can range from a navigation briefcase used in large aircraft to a smaller, soft sided publications bag used in a small aircraft, to even a saddle bag that is laid across the glare shield. In some cases, the pockets of the g-suit are used to hold many of the publications—not the preferred placement for a safe ejection. On some larger aircraft, the majority of the publications are permanently stored onboard.

Having an electronic display replace the paper documents currently in use not only saves space and weight, but it also offers operational advantages. An electronic flight bag can become the ultimate situational awareness (SA) multiplier. As a high quality display, it can be used not only to present words to the pilot, but pictures and graphics, rasterized and rendered imagery through a simple human interface.

Due to certification and safety oversight responsibilities, the Federal Aviation Administration (FAA) has become involved in the certification of these devices. In the FAA's Advisory Circular No: 120-76B, electronic flight bags are defined as "Electronic computing and/or communications equipment or systems used to display a variety of aviation data or perform a variety of aviation functions. In the past, some of these functions were accomplished using paper references. The scope of EFB functionality may include data link connectivity. EFBs may be portable electronic devices or installed systems. The physical EFB display may use various technologies, formats, and forms of communication. This definition expands into two very important areas. It includes installed devices which could be both more sophisticated and complex, otherwise known as Class II or III EFBs, and it introduces data link connectivity, a design feature of the present disclosure. Nevertheless, with the advent of the iPad™ or other commercially available tablets as further "accessorized" by the EFB System integration and the software as a planning/flight/post flight tool, a hybrid solution has evolved. This solution system marries portability, ruggedness, connectivity, and the ability to semi-permanently mount with human factor suitability in a lightweight, man-portable, self-contained, easily operated enabling unit that can be used in both the mounted and dismounted environments.

A useful human factors study was conducted in 1996 by the Advanced Cockpits Branch at Wright-Patterson AFB with three major objectives. The first objective was to compare pilot performance using four (4) types of display presentations: monochrome north-up, monochrome track-up, color north-up and color track-up. The second objective was to investigate the benefits of providing the pilot with a zoom capability to de-clutter the screen and increase visual detail. The final objective was to compare these four formats both in precision and non-precision approaches.

The study used sixteen (16) subjects. Six pilots had fighter experience, eight had tanker/transport experience, and two pilots had experience in both. The simulator used was similar to an F-16 cockpit, outfitted with five (5) CRT displays. The results of the study showed a statistically significant increase in pilot workload when using the monochrome EAPs. This led to their recommendation for designers to utilize color EAPs. The group's final recommendation was that a zoom feature be incorporated with the initial view showing the entire approach procedure. The comparison between precision and nonprecision approaches found that in north-up the pilot's airspeed deviations were slightly better on the non-precision approaches, and in track-up their airspeed deviations were slightly better on precision approaches. This led to the suggestion of making these views selectable and zoom scalable. The designs of the present disclosure, as well as the iOS platform and hardware input/output (I/O) incorporate each of these features natively, as controlled by simple gestures and a "pinch" maneuvers on the screen.

Finally, it is critical that pilots be involved in the design process. They must accept the device if they are to use it. If a new technology is more difficult, has slow computing, is not easily transported or cannot be ruggedized to withstand their operating environment, or they just do not like the form factor or operating system, pilots will resist the change. The challenge has been to design an EFB that increases situational awareness and makes the job easier to perform. The Apple® iPad™ (or other electronic tablets), by making tedious functions simpler, has enabled the pilot by allowing him/her to be able to concentrate on the more important task of flying the plane. EFBs are a significant device upgrade from the traditional technology.

The present disclosure offers a powerful intelligent hardware and software integration platform, which will be used as a framework for current and future integrated flight planning, briefing, benchmarking, flight reference, intelligence gathering, weapons/loads deployment, post-flight analysis and training. One objective of the present disclosure is to utilize the existing EBF interface software and refine it to implement a highly competent solution capable of functioning as a flight planning tool, flight assistant tool, flight analysis tool and day-to-day user desktop assistant; i.e., a tool which performs certain designated tasks as defined by the user.

While there have been significant advancements in avionics development, there are many areas where technological advances and improvements are required before true functionality and value can support widespread adoption of a joint EFB platform. The focus of the present disclosure is twofold: 1) advance the state of the art in the mechanical and systems/electrical integration of COTS devices for deployment of the device as an EFB; and, 2) refinement of the EFB interface software for iOS, allowing it to passively access and utilize avionics bus information such as GPS, Pressure Air Data, Air Space Traffic, Airport Ground Movements, FMS Flight Plans and other such information across diverse airframe and weapons systems.

The present disclosure will answer the following research questions:

RQ1—What are the appropriate functions of an EFB/pilot assistant tool? An EFB is expected to function as a computational assistant and reference to the user. Here we are interested in determining the most appropriate roles and tasks that the Apple® iPad™ based EFB should perform to support the user throughout all phases of flight planning, execution, and debriefing.

RQ2—What is the appropriate architecture for providing EFB functionality? After defining the functionality required in an Apple® iPad™ based EFB, it is necessary to develop an appropriate architecture for supportive software in terms of hardware, mechanical/physical integration, and systems/electrical interfacing.

RQ3-How can an Apple® iPad™ based EFB solution best interact with users, the underlying aircraft, and the existing flight planning infrastructure? There are at least three interfaces of interest in developing an effective EFB: the user I/O interface, the avionics system communications interface, and the interface between the EFB and the flight planning route server and threat database servers. Each of these interfaces present interesting challenges. For example the user interface should be adaptable to the user's information-seeking needs and preferences. At the same time, the interface should not change substantially or the user will become disoriented between one work session and the next. Alternately, the system should maximize the computing power and display resolution performance of the Apple® iPad™ while communicating with, and presenting information from, legacy Windows® based operating systems and database servers such as route and aeronautical files. Finally it is necessary to define the specifications of the avionic interface module such that the iPad™ can easily navigate the availability of data across a diverse spectrum of aircraft data sources regardless of airframe or sensor manufacturer, while defining the utilization of the unique data streams in a library or software developer kit (SDK).

Functional Communications Interface. Interaction with remote data sources, such as aircraft avionics sensors, must be sufficiently complex that the utilization of such data can be satisfactorily demonstrated within the EFB suite of the present disclosure. These interfaces should initially be passive in nature and mitigate the potential for molestation of the bus information. This passive interface setup ensures that there is no risk of misrepresenting these flight critical data in the pilot's primary flight instruments. Additionally, the data, when passed from the AIM to the iPad™ device should be encrypted and authenticated according to a standard acceptable to the Apple® hardware device specification. The deliverable, a functional standard, will define the airframe systems to be interfaced with the iPad™ so that the EFB device properly recognizes that it [iPad EFB] is "mounted" to the airframe, is able to make the necessary operating system and iPad hardware environmental adjustments to support safe operations; and, that the FalconPad™ suite understands what data may be available on the data stream so that the application can utilize such data appropriately. This subtask leads into our next major task, which relates to the AIM itself.

Another task of the present disclosure is concerned with specifying the functional and performance requirements of the Avionics Interface Module (AIM) and producing a qualified product. The specification will describe the detailed requirements for the AIM device itself; and, how it brings in and consolidates heterogeneous data sources and transmits them unmolested into a single stream of data. The AIM must monitor the state of its operating environment using some kind of sensor, develop an assessment of the state of that environment, and notify the user of any action that is necessary based on the availability of airframe sensor data, AIM system health and the resolution level of data.

The sense function allows the system to monitor the state of the environment in which the system exists. For the EFB of the present disclosure, the environment consists of the aircraft data bus "network" environment and that of the iOS software environment. The primary deliverable will be the basic Avionics Interface Module (AIM) device itself.

Yet another task of the present disclosure is to ensure the continued serviceability of the iPad™ device platform in the harsh environment of the aircraft flight deck, as well as non-aircraft environments from which the pilot/user might be deployed and rely upon its use. To ensure the ruggedness of the unit, it should be encased such that it can be hardened to meet the stringent requirements of certain types of aircrafts for drop shock, impact resistance, crush proving, moisture and particulate migration. The device should also be fully functional from within the enclosure, allowing the user to synchronize data and perform device charging, without creating an additional risk to the device by having to remove it from its ruggedized enclosure. The case should also be able to adapt to modified aircraft in a "mounted" fashion, specific to each unique type/model/series aircraft; and, support independent "dismounted" operations that take into account human factors such as device security and maneuverability, illumination, and NVIS compatibility when powered either by its internal battery or from an available power source. An In-Case mounting enclosure of the present disclosure can perform the above functions.

Another task of the present disclosure is to identify, via airframe physical survey and aircraft flight evaluation, the miscellaneous installation variations affecting EFB placement and mounting apparatuses both for pilot/copilot/other aircrew flight stations across the diverse fleet of Air Force airframes. The primary deliverables will include an installation data package, master kit design data package, system safety assessment, interface loads assessment, failure modes and hazards assessment, instructions for continued airworthiness, aircraft operational supplements and project specific certification plans for each unique aircraft installation configuration. Secondary deliverables will include several unique EFB installation kits for military aircraft, inspected at origin by DCMA.

According to one aspect of the present disclosure, a mounting system is designed to enable operators to easily hard mount/un-mount Class 2 COTS tablet EFBs while simultaneously providing FAA compliant power and aircraft system/sensor interfaces to the EFB through the hard mount. The mount's Enclosure is an integral part of this process in that the design of the Enclosure enables the quick connect/disconnect of power and data to the tablet EFB on either an EFB mount or EFB kneeboard. Additionally, the design of the Enclosure protects the tablet EFB, in and out of the cockpit, from drop, shock, particulate-moisture migration and helps to level out environmental extremes.

For example, the Mounting System of the present disclosure supports Apple© iPad™ devices and protects against:
  Drop Shock Hazards
  Crush Hazards
  Particulate Migration
  Moisture Migration
  High-impact polycarbonate frame system
  Shock protective/flame resistant VersaFlex™ outer-membrane
  Mission adaptable screen-overlay protection for:
  Clear|UV Filtering|Anti-glare|NVIS (Leaky-green Type II)

According to another aspect of the present disclosure, a data connectivity interface is disclosed. For example, the data connectivity interface may offer an AIM (Aircraft Interface Module) solution. The AIM device can collect analog and digital data from aircraft system/sensors. The AIM device is Ethernet capable and is scalable (designed for future growth in terms of interfaces and functionality).

The AIM is designed for a "wired" interface with the tablet EFB. Many operators are now leaning towards a "wired" interface solution to mitigate any current/future concerns the FAA may have regarding Wi-Fi in the cockpit. Also, a "wired" interface eliminates any concerns regarding data latency within certain EFB applications/programs. A drawing of the AIM according to an embodiment is shown in FIG. 1.

In one aspect of the present disclosure, an aerospace grade analogue/digital-to-digital conversion apparatus, known as the Avionics Interface Module (AIM), is provided. The AIM collects data outputs from a plurality of analogue and digital avionics and electrical data sources. The analogue-to-digital and digital-to-digital conversion apparatus includes an interleaving and data conversion capable of aligning the digital data respectively output from the plurality of digital data sources and commingle them in order to generate a data sequence interpreted by a receiving device of the like and type of a Commercial off the Shelf (COTS) tablet computer specifically including but not limited to, the Apple iPad.

A second aspect of the present disclosure involves a program, known as the software developer's kit (SDK), which functions as a library of acceptable use and behavior for various aspects of digital data output by the AIM. The SDK program allows application software developers to utilize the digital data outputs from the AIM in the software environment they choose to create and/or deploy. Examples of the use and deployment of the SDK include the ability of an application creator to utilize aircraft navigation data as received from the AIM, including such information as aircraft positional and directional detail, and incorporate such sensor data into, for example (but not limited to), visual quest or overlays representing aircraft speed, direction of travel, altitude and location; or, representations of other local air traffic and their position and altitude in relation to a known position as derived from sensors output to the AIM, and from the AIM to the attached COTS tablet device, where it is utilized within the included software according to the constraints as defined in the SDK library.

A third aspect of the present invention involves a hardware mounting system for a tablet EFB. The mount is comprised of two assemblies, the aircraft side mount which is statically affixed mechanically and electrically to the aircraft; and the InCase tray dock.

Figure 2:
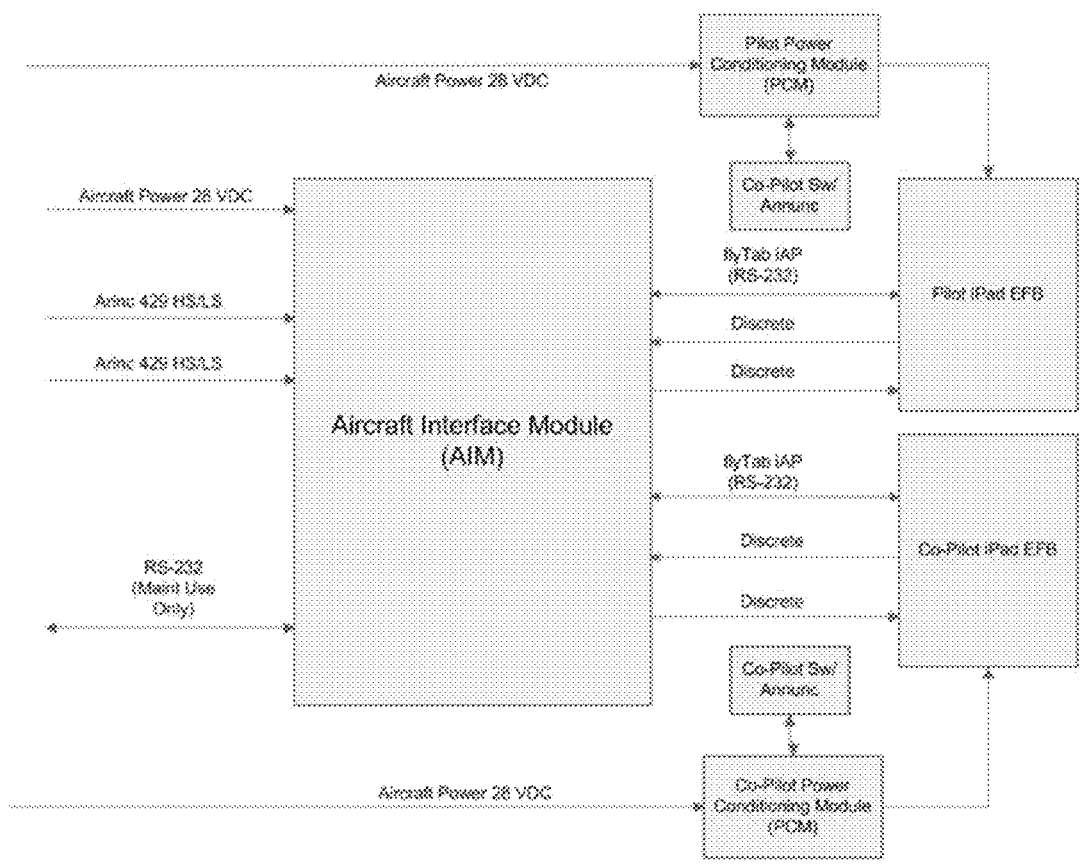
FIG. 2 is a block diagram relating to an operation of the avionics interface module according to an embodiment of the present disclosure.

The Avionics Interface Module (AIM) is an application specific unique data converter designed to provide an interface between the GPS/GNSS or FMS/FMC/EFIS (A429) input data bus and a COTS Tablet Computing Device, specifically an Apple iPad, when such as device is deployed in the capacity of an Electronic Flight Bag. When GPS/GNSS input is used, the Air Data Computer (ADC) label 204 will provide the necessary altitude input data. The output of the converter are NEMA sentences and other available avionics bus data which has been converted into the Apple iAP data bus protocol for use in products of the Apple iOS devices list, or other OEM specific data interface requirements as applicable. A simplified block diagram relating to the operation of the AIM is shown in FIG. 2.

Inputs. The inputs below are representative of typical A429 data labels available from traditional FMS and EFIS installation interfaces which would be "tapped" for use within the EFB environment. The following list is representative only and not exhaustive. For a complete listing of ARINC A429 Data Bus labels, reference ARINC Specification 429 latest revision, Attachment 1-1 "Label Codes," and 1-2 "Equipment Codes."

| A429 Input Label | Data Description |
| --- | --- |
| 001 | Distance to Go (BCD) |
| 002 | Time to Go (BCD) |
| 003 | Cross Track Distance (BCD) |
| 004 | Runway Distance to Go (BCD) |
| 005-006 | Engine Discrete (DSC) |
| 010 | Present Position - Latitude (BCD) |
| 011 | Present Position - Longitude (BCD) |
| 012 | Ground Speed (BCD) |
| 013 | Track Angel - True (BCD/DSC) |
| 014 | Magnetic Heading - True (BCD) |
| 015 | Wind Speed (BCD) |
| 016 | Wind Direction - True/TCAS Mode (BCD/DSC) |
| 017 | Selected Runway (BCD) |
| 020 | Vertical Speed - Landing Gear Position (BNR/DSC) |
| 021 | Engine Monitoring - Landing Gear Position (BNR/DSC) |
| 022 | Landing Gear Position (DSC) |
| 074 | UTC Measure Time (BNR) |
| 120 | GNSS Longitude Fine (BNR) |
| 121 | GNSS Longitude Fine (BNR) |
| 125 | UTC (Time) (BCD) |
| 150 | UTC (Time) (BNR) |
| 151 | Bearing (BNR) |
| 201 | GPS/GNSS Sensor (SAL) |
| 204 | Baro Corrected Altitude (BNR) |
| 216 | ICAO Aircraft Address (BNR) |
| 260 | Date (BCD) |
| 261 | Flight Number (BCD) |
| 270 | Misc Discrete Data (DSC) |
| 275 | Misc Warning (DSC) |
| 310 | Present Position Latitude (BNR) |
| 311 | Present Position Longitude (BNR) |
| 312 | Ground Speed (BNR) |
| 313 | Track Angle (BNR) |
| 314 | True Heading (BNR) |
| 317 | Track Angle (BNR) |
| 320 | Magnetic Heading (BNR) |
| 322 | Flight Path Angle (BNR) |
| 350 | GPS Test Word (DSC) |
| 355 | GNSS Fault Summary (DSC) |
| 375 | GPS Differential Correction Word A (BNR) |
| 376 | GPS Differential Correction Word B (BNR) |
| 377 | Avionics Equipment identification (BCD/DSC) |

Outputs. The unit outputs Apple iAP, or other as defined by application, NEMA (GPS) data sentences in the basic configuration. In expanded configurations the AIM outputs Apple iAP Data Sentences which include information pertaining to each/and/or/any combination of the following: Terrain, Traffic, ADS-B, Transponder, Radio Communications, Weather, Course, Track, Azimuth, Position, Speed, Altitude, Route, Waypoint, Time, Distance To Go, Time to Go, Ground Speed, ADF Frequency, ILS Frequency, VOR/ILS Frequency, DME Frequency, Set Position Altitude, Set Position Longitude, Set Position Latitude, Active Waypoint, Heading/Bearing, Deviation, Magnetic Variation, Angle of Attack, Wind on Nose, Localizer Deviation, Glideslope Deviation, Baro Corrected Altitude, True Airspeed, Static Air Temperature, Display Control, Magnetic Heading, Lateral Scale Factor (Precision), Vertical Scale Factor (Precision), Flight Plan Distance to Destination, Flight Plan Estimated Time to Destination, Destination Local Time Offset, and Aviation Equipment Identification Code and/or other aircraft system sensor data as may be required to support future EFB functionality such as FANS.

As discussed above, the AIM collects analog and digital data from aircraft system/sensors and provides it to the iPad EFB via an industry-unique passive "wired" interface. The AIM is Ethernet capable and scalable (designed for future growth in terms of interfaces and functionality). Given a choice between a "wired" and "wireless" (Wi-Fi) interface, operators have demonstrated a strong preference for a "wired" interface to mitigate any current/future concerns the FAA may have regarding Wi-Fi in the cockpit. In addition, a "wired" interface eliminates any concerns regarding data latency within certain EFB applications/programs. Finally, military, governmental and special flight operators all appreciate the enhanced security offered by a "wired" interface.

There are many considerations in installing and certifying an EFB of any hardware class and software type and much of the guidance that the present disclosure relies upon is contained in the following FAA documents:

| Appendix | Document | Subject |
| --- | --- | --- |
| A | AC 120-76A | Provides the FAA's basic method of compliance for the certification, airworthiness, and operational approval of portable and installed EFBs. |
| B | 8900.1 Vol 4 Ch 15 | Provides specific policy, guidance, and procedures to be used by principal operations inspectors (POI) for processing an operator's request for "authorization to use" an Electronic Flight Bag (EFB). FAA Order 8900.1, Vol. 4, Ch. 15 is the definitive regulatory standard for Air Carrier attainment of A061 OpSpecs. |
| C | ANM-01-111-165 | Policy Statement on Certification of Power Supply Systems for PEDs on Part 25 Airplanes. Necessary certification guidance for approval of a Class I EFB Power Supply per FAA Order 8900.1, Vol. 4, Ch. 15, Para. 4-1648(A)(1). |

Figure 3A:
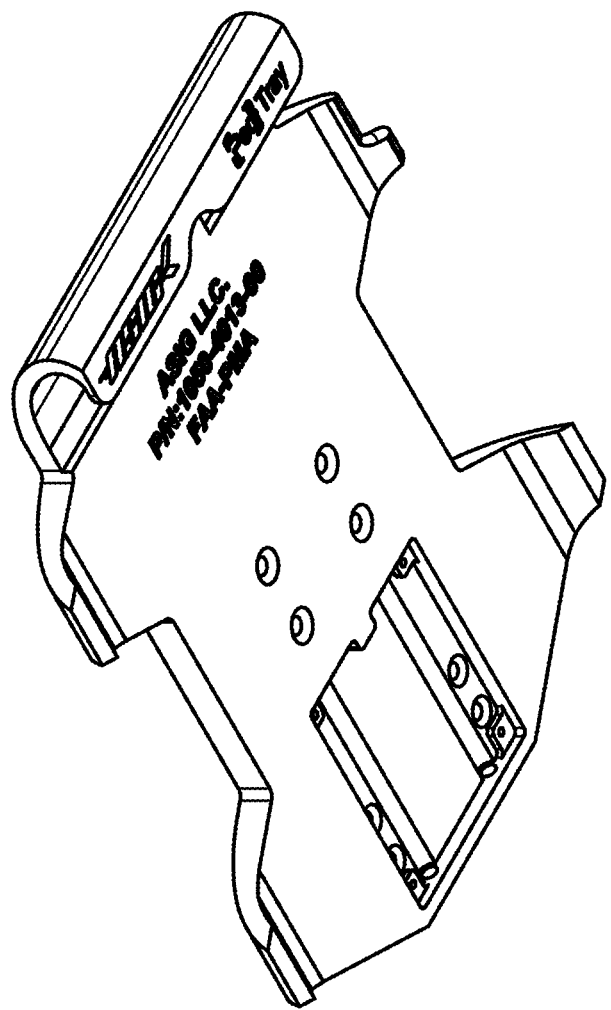
FIG. 3A is an isometric drawing of an enclosure for a tablet EFB according to an embodiment of the present disclosure.
Figure 3B:
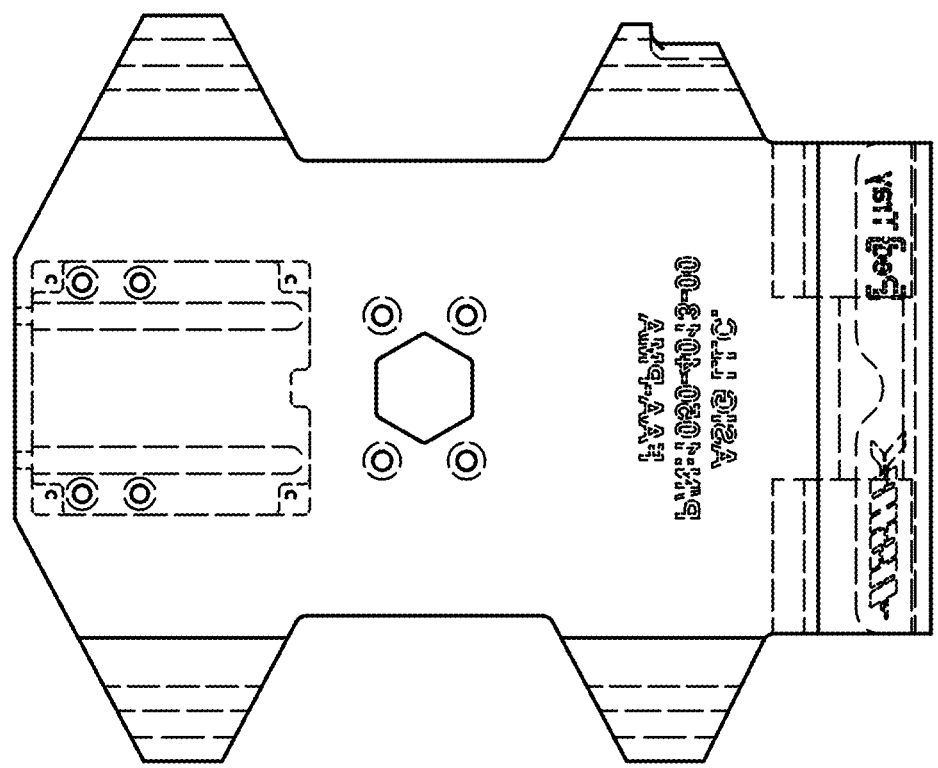
FIG. 3B is a top view drawing of an enclosure for a tablet EFB according to an embodiment of the present disclosure.
Figure 3C:
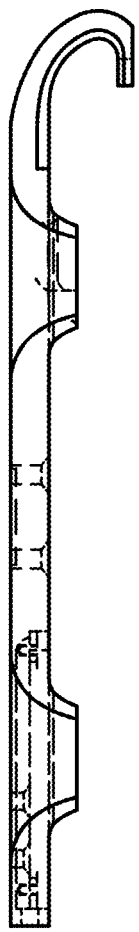
FIG. 3C is a side view drawing of an enclosure for a tablet EFB according to an embodiment of the present disclosure.
Figure 4A:
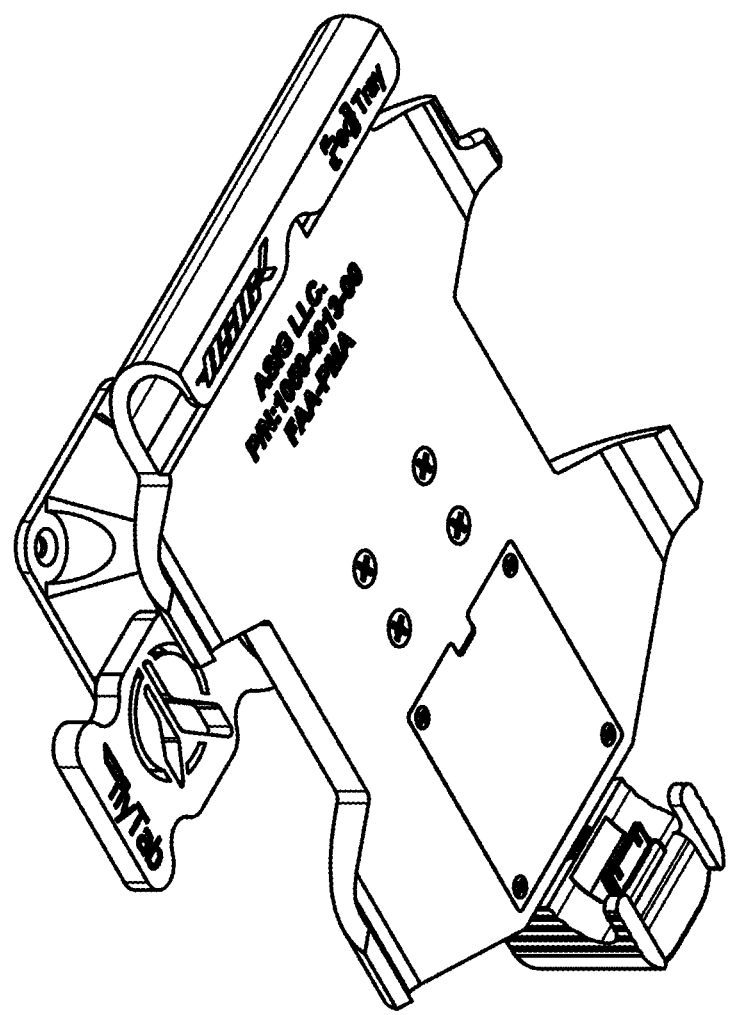
FIG. 4A is an isometric drawing of a mount for a tablet EFB according to an embodiment of the present disclosure.
Figure 4B:
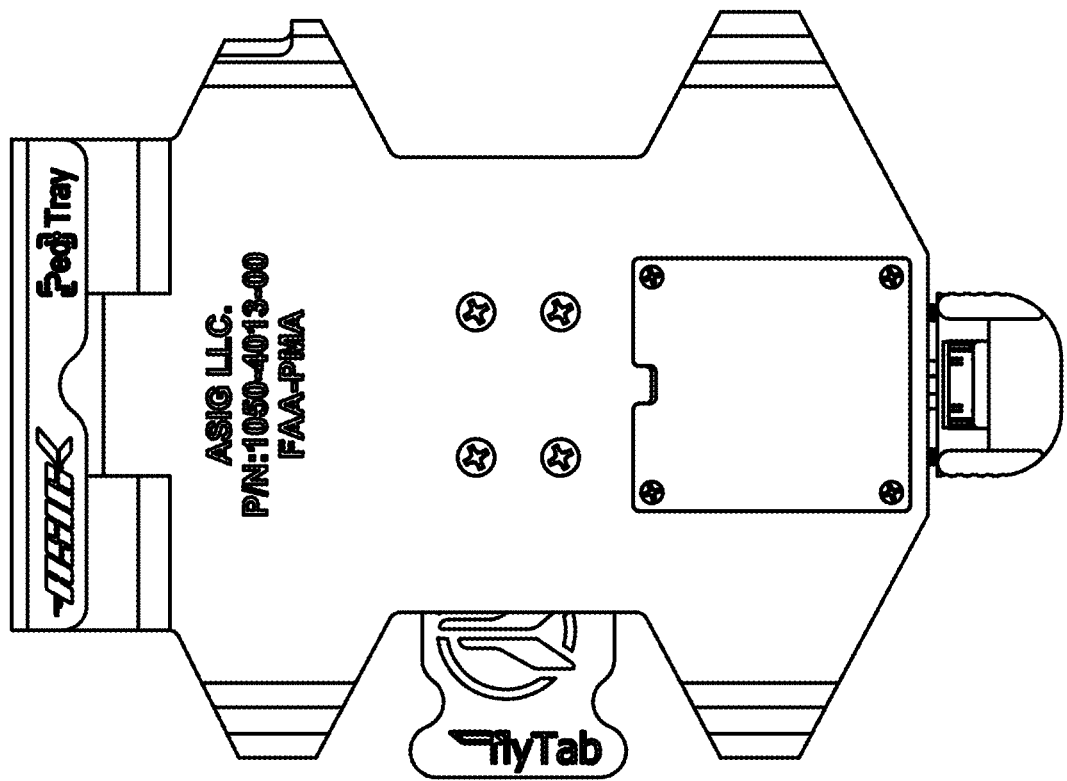
FIG. 4B is a top view drawing of a mount for a tablet EFB according to an embodiment of the present disclosure.
Figure 4C:
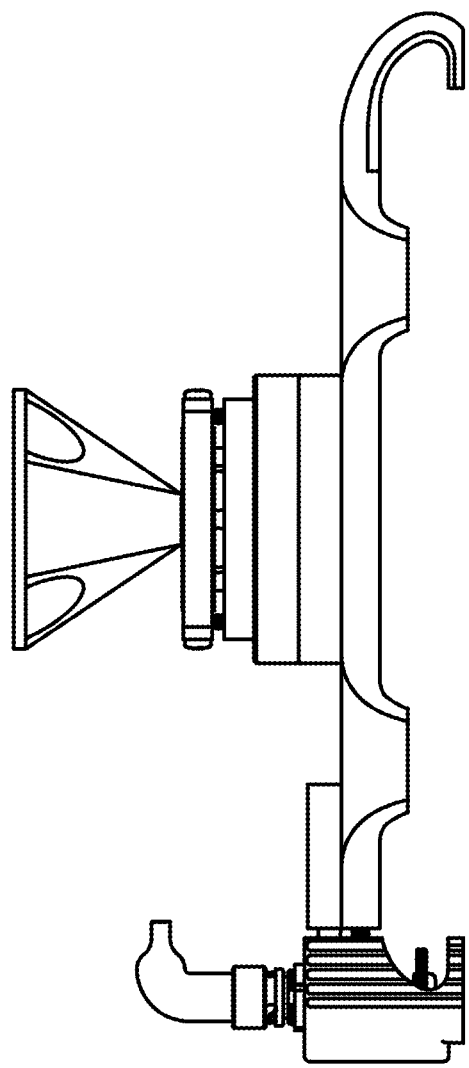
FIG. 4C is a side view drawing of a mount for a tablet EFB according to an embodiment of the present disclosure.
Figure 17:
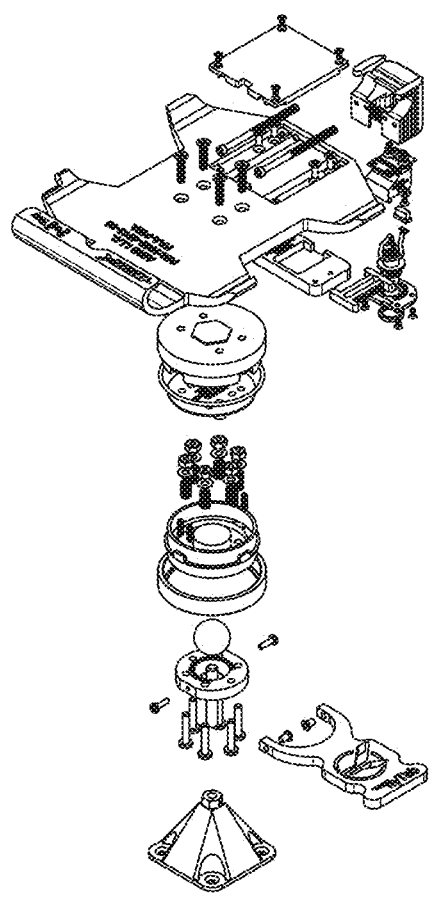
FIG. 17 is a exploded view of the PEDtray for a tablet EFB according to an embodiment of the present disclosure.

The In-Case Enclosure is a ruggedized mounting system. The enclosure contains, protects, powers and secures the iPad EFB in aircraft hard-mounts and/or Kneeboards (rapid interchangeability) to MIL-STD-810G standards. FIG. 3 shows several views of the In-Case enclosure according to an embodiment from different perspectives. The design features of the In-Case Enclosure include:

Lightweight polycarbonate exoskeleton shell protects embedded devices from crush hazards.
 Durable VersaFlex PTFE outer layer protects against drop-shock, dust migration and moisture penetration
 Complete access to all iPad buttons & ports
 Options for Clear, Anti-Glare, UV and NVIS Screen films
 Rapid aircraft mounting/demounting to the hard mount (powered or unpowered) and/or Kneeboard mounting system
 Certifiable Class II EFB Compliant Mount System
 Allows full access to the iPad 30-pin connector while in the case and not docked to the Hard point Mount A Mount of the present disclosure provides an aircraft hard-point mount for the "In-Case" Enclosure discussed above. FIG. 17 shows a drawing of the Mount from different perspectives according to an embodiment. The Mount's design allows 40° of movement of the "In-Case" Enclosure in all directions about the pivot point of the Mount. The Mount utilizes a traditional twist lock mechanism to adjust/maintain the desired viewing position for the iPad EFB. The Mount may be powered or unpowered. If powered, power is provided by a PCM power module. The aircraft side of the Mount consists of an adapter plate used to secure the Mount to the aircraft structure (not pictured below) that is custom designed for each different aircraft type/model. The iPad EFB side of the Mount consists of a docking pad. This docking pad is used to slide the "In-Case" Enclosure on to the hard-point Mount and/or the conformal Kneeboard. This rapidly interchangeable mounting design provides maximum flexibility for using the iPad EFB in a variety of different ways (normal daily use with a hard-mount and in aircraft that have not yet been retrofitted with a hard-point mount).

A Kneeboard of the present disclosure provides an iPad EFB mounting method for operators that do not desire, or aircraft that are not yet equipped with a hard-point mount for the "In-Case" Enclosure. (Kneeboards do not require installation or certification via PMA/STC.) The Kneeboard consists of a conformal plate (for adjustable comfort), a docking pad and two straps to secure the Kneepad to the user's leg. The docking pad is used to affix and secure the "In-Case" Enclosure on to the Kneeboard. The Kneeboard may be powered or unpowered. If powered, power is provided by a PCM1 "Dongle" of the present disclosure.

Figure 5A:
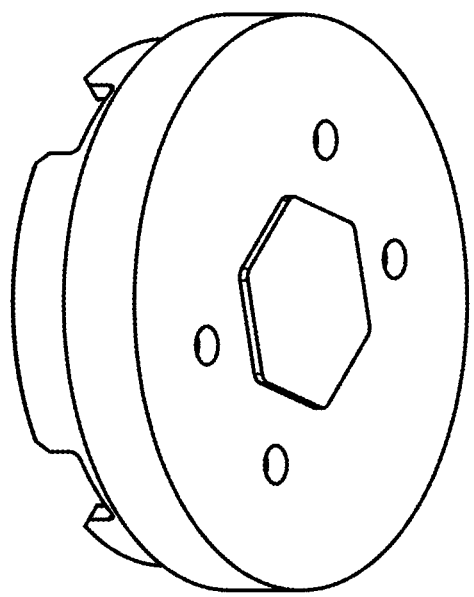
FIG. 5A is an isometric drawing of a mount adapter plate according to an embodiment of the present disclosure
Figure 5B:
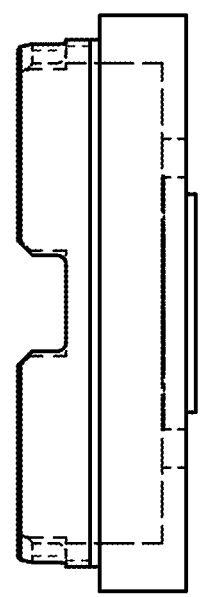
FIG. 5B is a side view drawing of a mount adapter plate according to an embodiment of the present disclosure
Figure 5C:
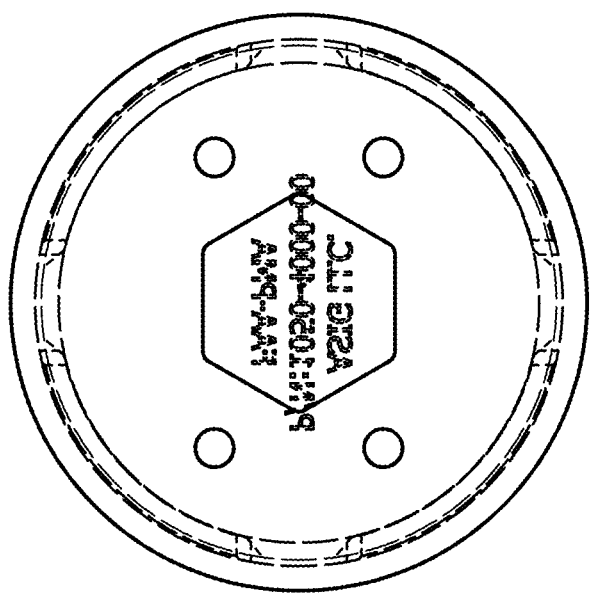
FIG. 5C is a top view drawing of a mount adapter plate according to an embodiment of the present disclosure
Figure 6A:
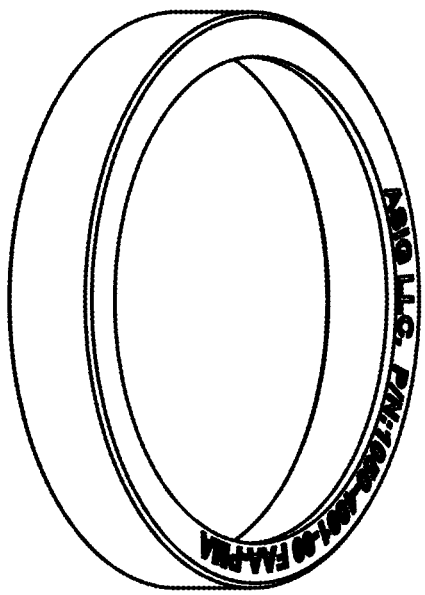
FIG. 6A is an isometric drawing of a mount clamp nut according to an embodiment of the present disclosure
Figure 6B:
FIG. 6B is a side view drawing of a mount clamp nut according to an embodiment of the present disclosure
Figure 6C:
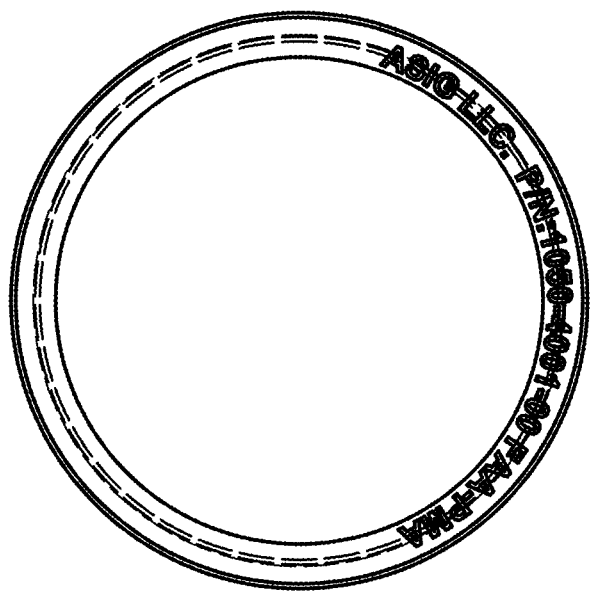
FIG. 6C is a top view drawing of a mount clamp nut according to an embodiment of the present disclosure
Figure 7A:
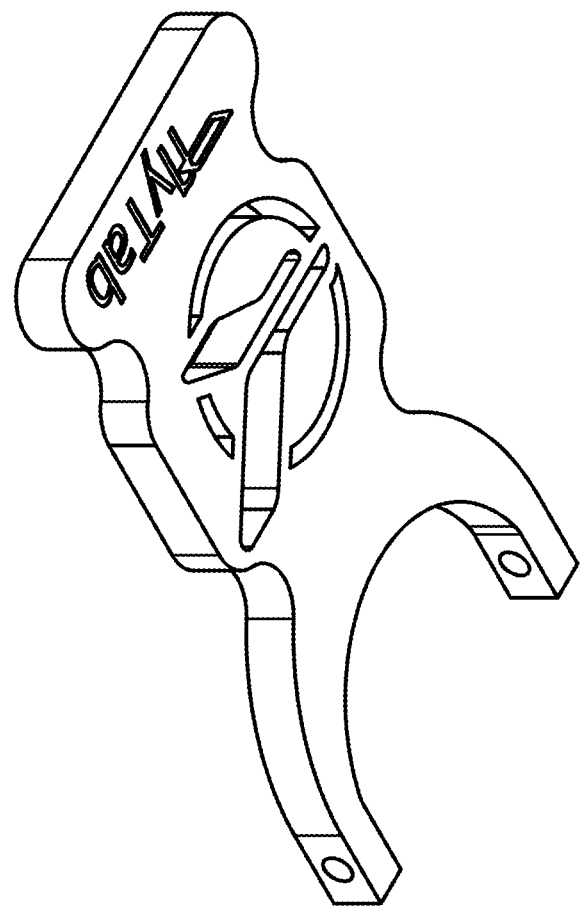
FIG. 7A is an isometric drawing of a mount adjustment handle according to an embodiment of the present disclosure
Figure 7B:
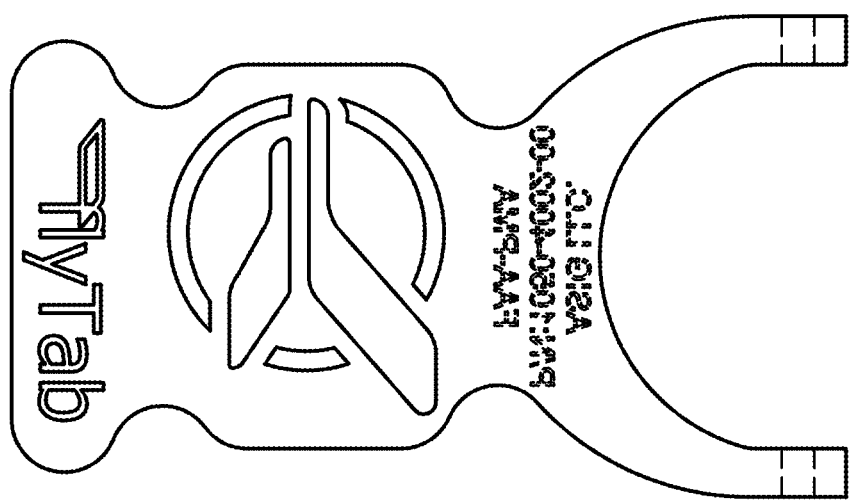
FIG. 7B is a top view drawing of a mount adjustment handle according to an embodiment of the present disclosure
Figure 7C:
FIG. 7C is a side view drawing of a mount adjustment handle according to an embodiment of the present disclosure
Figure 8A:
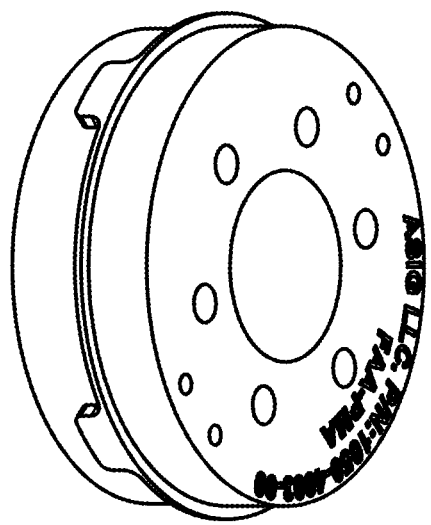
FIG. 8A is an isometric drawing of a top tension plate according to an embodiment of the present disclosure
Figure 8B:
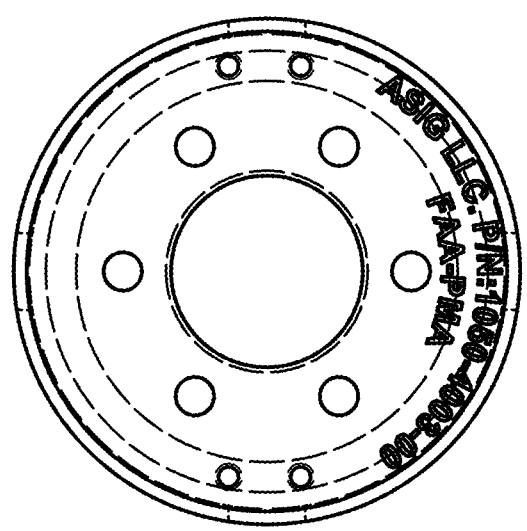
FIG. 8B is a top view drawing of a top tension plate according to an embodiment of the present disclosure
Figure 8C:
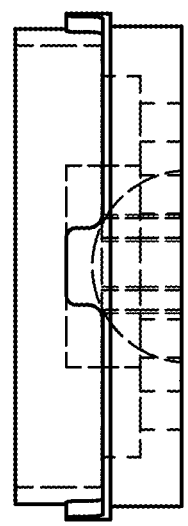
FIG. 8C is a side view drawing of a top tension plate according to an embodiment of the present disclosure
Figure 9A:
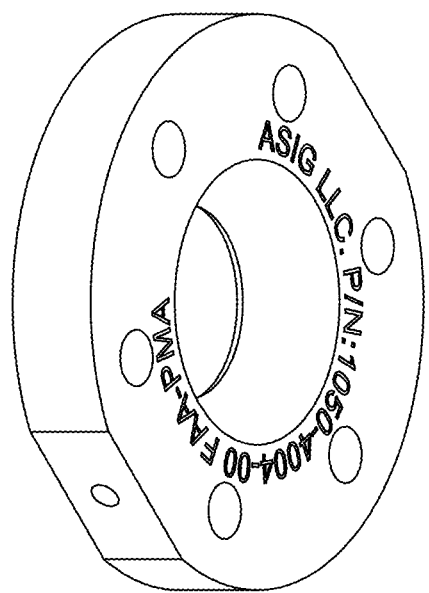
FIG. 9A is an isometric drawing of a bottom tension plate according to an embodiment of the present disclosure
Figure 9B:
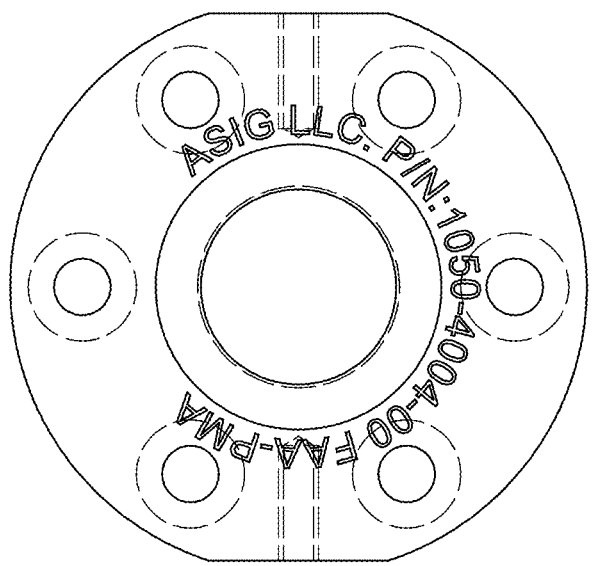
FIG. 9B is a top view drawing of a bottom tension plate according to an embodiment of the present disclosure
Figure 10A:
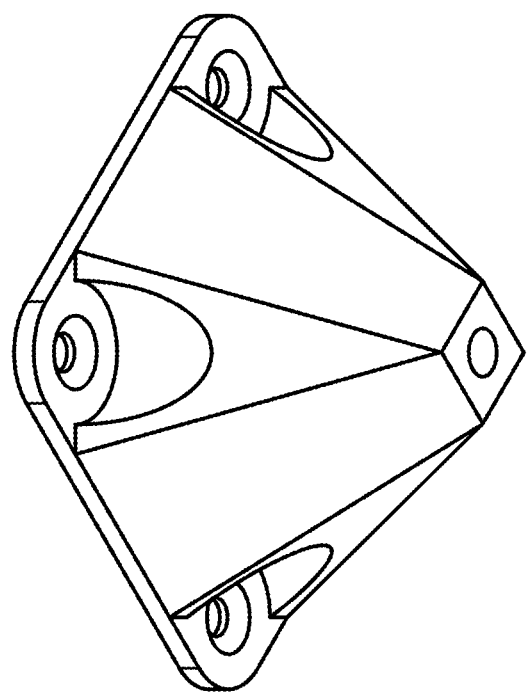
FIG. 10A is an isometric drawing of a mount base plate according to an embodiment of the present disclosure
Figure 10B:
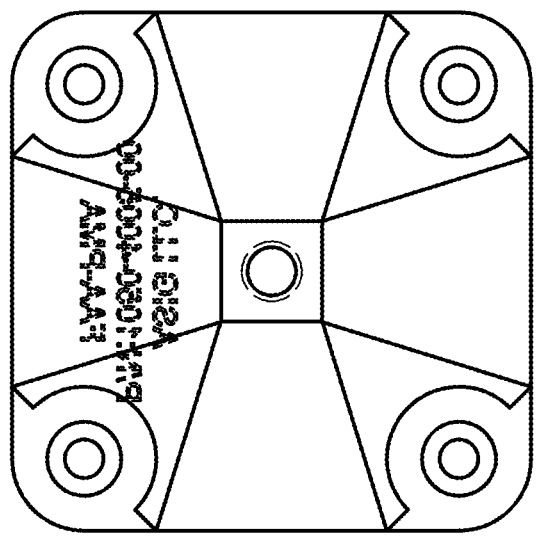
FIG. 10B is a top view drawing of a mount base plate according to an embodiment of the present disclosure
Figure 10C:
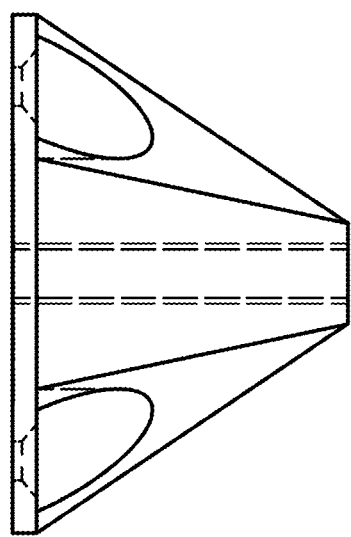
FIG. 10C is a side view drawing of a mount base plate according to an embodiment of the present disclosure
Figure 11A:
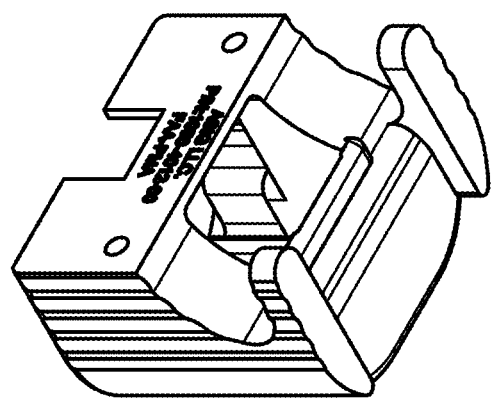
FIG. 11A is an isometric drawing of a pedtray clamp according to an embodiment of the present disclosure
Figure 11B:
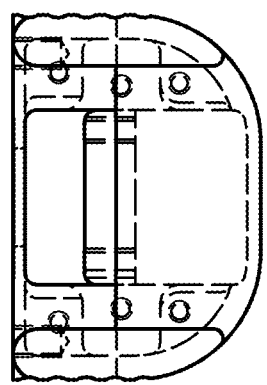
FIG. 11B is a top view drawing of a pedtray clamp according to an embodiment of the present disclosure
Figure 11C:
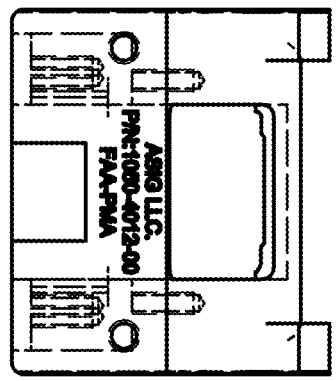
FIG. 11C is a side view drawing of a pedtray clamp according to an embodiment of the present disclosure
Figure 12A:
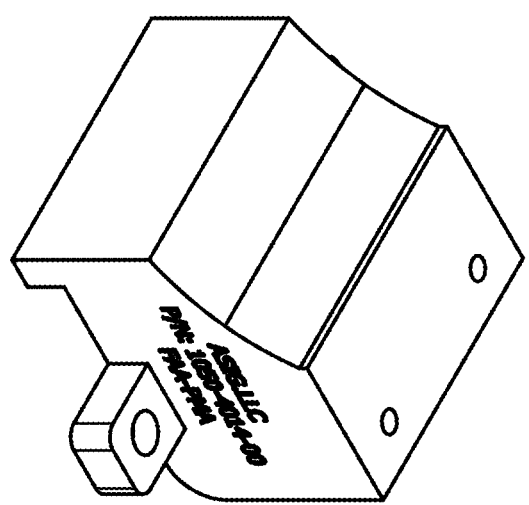
FIG. 12A is an isometric drawing of a pedtray dock connector mount according to an embodiment of the present disclosure
Figure 12B:
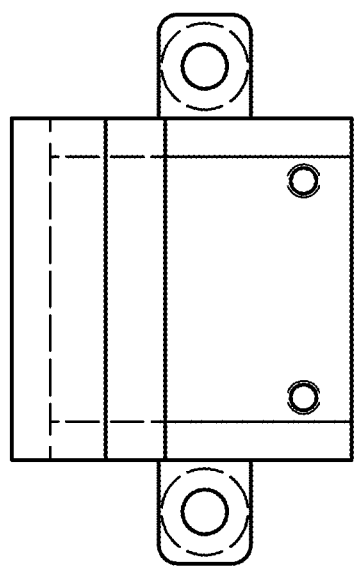
FIG. 12B is a top view drawing of a pedtray dock connector mount according to an embodiment of the present disclosure
Figure 12C:
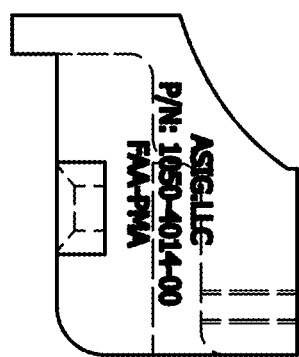
FIG. 12C is a side view drawing of a pedtray dock connector mount according to an embodiment of the present disclosure
Figure 13A:
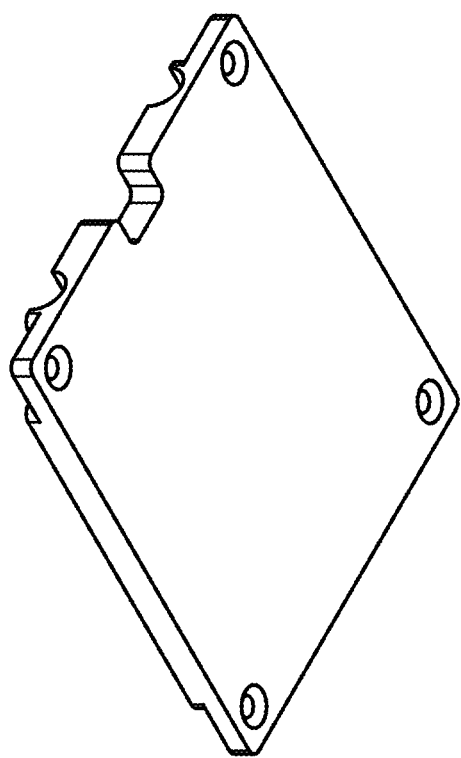
FIG. 13A is an isometric drawing of a pedtray tray cover according to an embodiment of the present disclosure
Figure 13B:
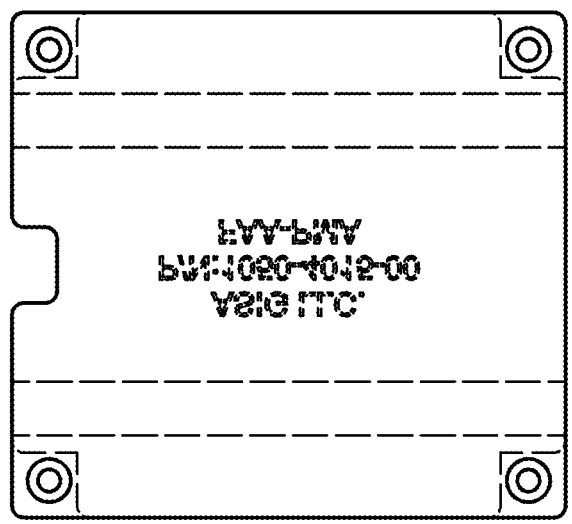
FIG. 13B is a top view drawing of a pedtray tray cover according to an embodiment of the present disclosure
Figure 13C:
FIG. 13C is a side view drawing of a pedtray tray cover according to an embodiment of the present disclosure
Figure 14A:
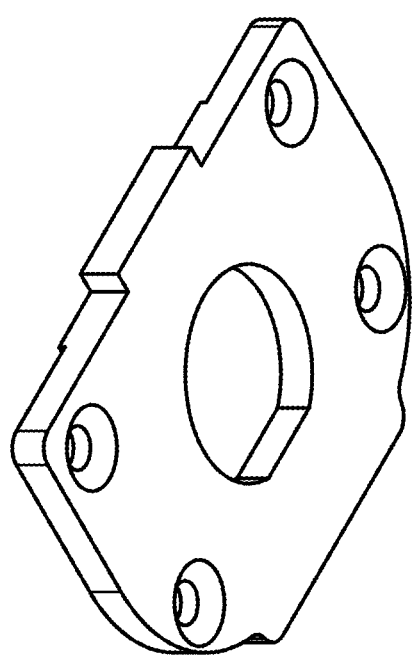
FIG. 14A is an isometric drawing of a pedtray clamp cover according to an embodiment of the present disclosure
Figure 14B:
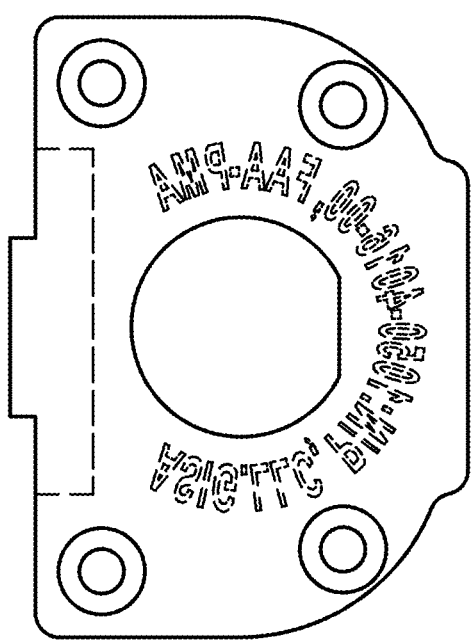
FIG. 14B is a top view drawing of a pedtray clamp cover according to an embodiment of the present disclosure
Figure 14C:
FIG. 14C is a side view drawing of a pedtray clamp cover according to an embodiment of the present disclosure
Figure 15A:
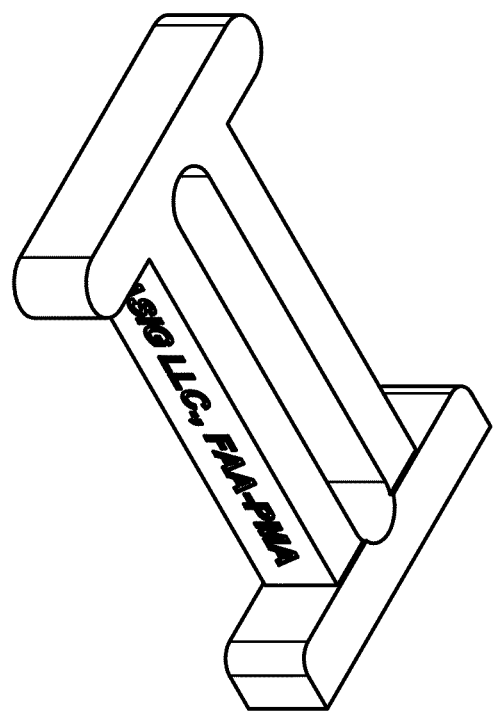
FIG. 15A is an isometric drawing of a pedtray support clamp according to an embodiment of the present disclosure
Figure 15B:
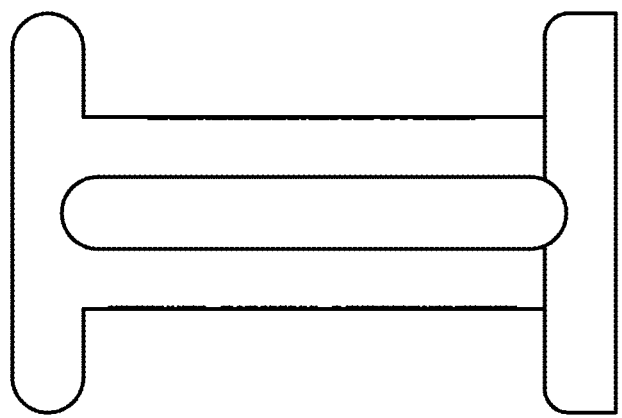
FIG. 15B is a top view drawing of a pedtray support clamp according to an embodiment of the present disclosure
Figure 15C:
FIG. 15C is a side view drawing of a pedtray support clamp according to an embodiment of the present disclosure
Figure 16A:
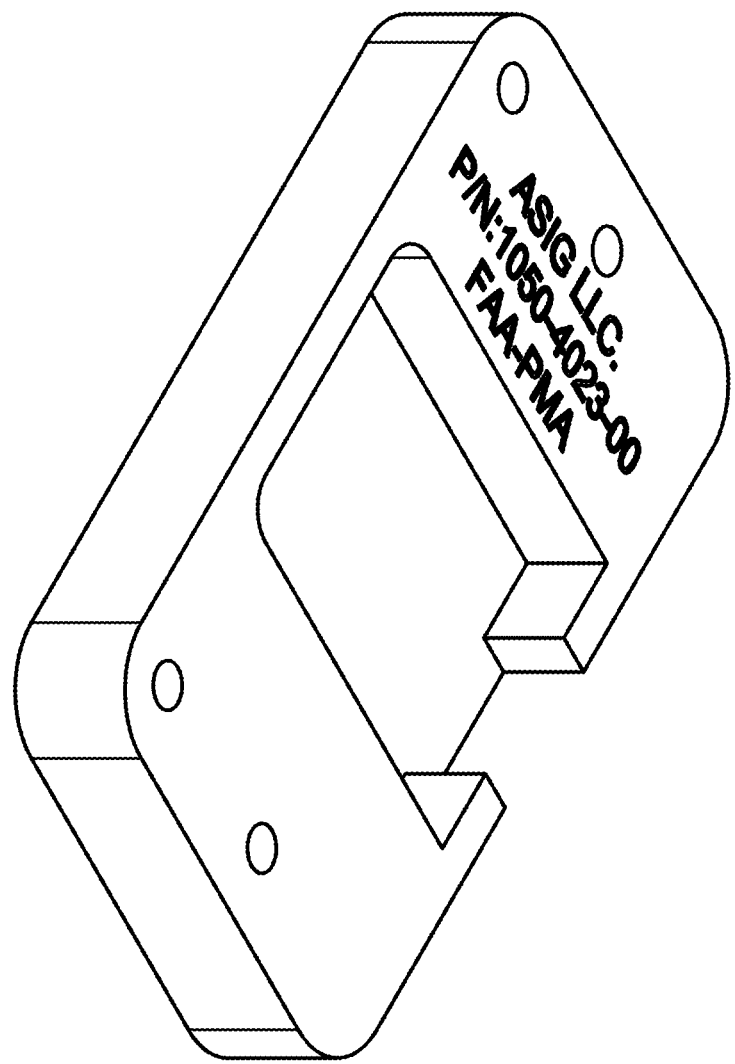
FIG. 16A is an isometric drawing of a pedtray support clamp cover according to an embodiment of the present disclosure
Figure 16B:
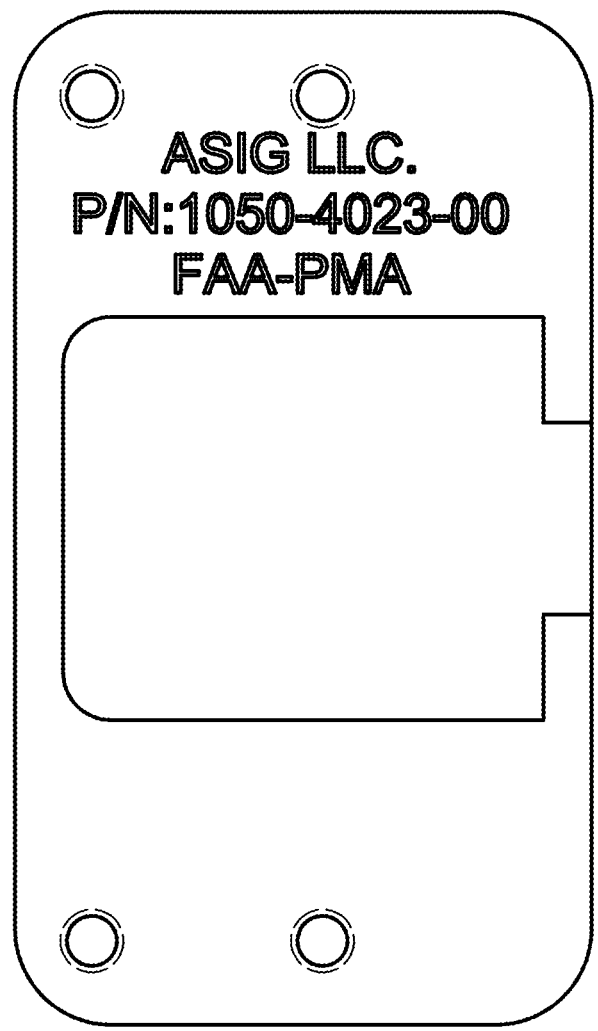
FIG. 16B is a top view drawing of a pedtray support clamp cover according to an embodiment of the present disclosure
Figure 16C:
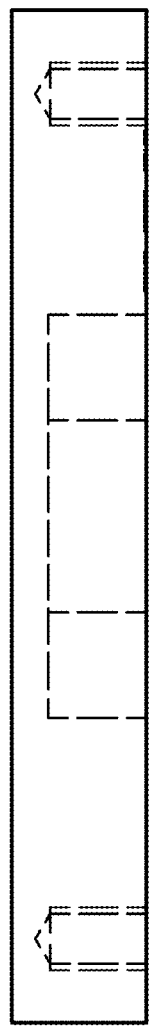
FIG. 16C is a side view drawing of a pedtray support clamp cover according to an embodiment of the present disclosure

According to some aspects of the present disclosure, a PEDtray PED/EFB mount is also provided. FIG. 17 a drawing of the PEDtray PED/EFB mount from different perspectives according to an embodiment. The PEDtray PED/EFB mount is a simple and low cost hard-point mount for the iPad EFB. The PEDtray mount includes:

1. EFB Tray
    Holds the EFB and provides an attachment to the adjustment knob.
2. Adjustment Knob
    Allows the pilot to adjust the viewing angle/position of the EFB.
3. Adapter Plate (Shown in FIG. 5)
    Mates/secures the tray/adjustment know assembly to the aircraft structure in the cockpit.

The PEDtray mount is designed to hold a generic "brick" which can be an iPad EFB, some other PED, a clipboard, or any other "brick" weighing up to several lbs. The physical characteristics of the mount solutions of the present disclosure may vary depending on aircraft type.

The various acronyms appearing in the present disclosure are defined as follows:
ADC Air Data Computer
ADF Automatic Direction Finder
ADS-B Automatic Dependent Surveillance—Broadcast
AIM Avionics Interface Module
BCD Binary Coded Decimal
BNR Binary Data
COTS Components off the Shelf
DME Distance Measuring Equipment
DSC Discrete Data
EFB Electronic Flight Bag
EFIS Electronic Flight Instrument System
FANS Future Air Navigation System
FMC Flight Management Computer
FMS Flight Management System
GNSS Global Navigation Satellite System
GPS Global Positioning System
iAP iPod/iPhone/iPad/iOS Accessory Protocol
ILS Instrument Landing System
iOS iPod/iPhone/iPad Operating System
NEMA National Electronic Manufacturers Association
RMC Range Management Control
SDK Software Development Kit
TCAS Traffic Collision Avoidance System
TAWS Terrain Awareness Warning System
UTC Universal Time Constant
VOR Very High Frequency Omni-directional Radio-range The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An aerospace grade data conversion system, comprising:
    An avionics interface module that contains a microprocessor, cache memory, analog, digital and ARINC transceivers and discrete I/O circuitry, an internal power supply and digital circuitry EMI/transient protection, a software developer's kit, and a mounting system that collects data from a plurality of analog and digital avionics and electrical data sources; that aligns digital data respectively from the plurality of digital data sources; that comingles the digital data in order to generate a data sequence interpreted by a receiving device, the receiving device including an electronic tablet electro-mechanically mounted in an aircraft, that receives and interprets a data stream output from the avionics interface module after accessing a software developer's kit consisting of machine readable language that allow application software developers to access and utilize the data stream output.

2. The avionics interface module according to claim 1, where the aligning of the incoming data stream is done so in a manner that allows application software developers to open an mutually authenticated transport protocol in order to utilize the digital data outputs via a software developer's kit that consists of a library of machine readable language configured to allow application software developers to access and utilize digital data output from an avionics interface module.

3. The avionics interface module according to claim 1, where the avionics module mutually authenticates device identity with that of a system attached iPad or other tablet computers prior to comingling of the digital data which can be interpreted by a receiving application properly provisioned via a software developer's kit that consists of a library of machine readable language configured to allow application software developers to access and utilize digital data output from an avionics interface module.

4. The avionics interface module according to claim 1, where the collection of data outputs is interpreted, parsed and qualified for use as Class I or II electronic flight bag solution via a software developer's kit that consists of a library of machine readable language configured to allow application software developers to access and utilize digital data output from an avionics interface module.

5. The avionics interface module according to claim 1, that aligns of the incoming data stream is done so in a manner that allows the data to be accessed by an Apple iPad, or other tablet computer via a software developer's kit that consists of a library of machine readable language configured to allow application software developers to access and utilize digital data output from an avionics interface module.

6. The avionics interface module according to claim 1, where the comingling of the digital data can be interpreted by an Apple iPad, or other tablet computer via a software developer's kit that consists of a library of machine readable language configured to allow application software developers to access and utilize digital data output from an avionics interface module.

7. The software developer's kit according to claim 1 consisting of a library of machine readable language configured to allow application software developers to utilize digital data output received from a connected avionics interface module.

8. The software developer's kit according to claim 1 further comprising an iOS device or commercial off the shelf electronic tablet.

9. The software developer's kit according to claim 1 that consists of a combination of the avionics interface module hardware and the software developer's kit connecting multiple analog, discrete and digital data including but not limited to ARINC 429, ARINC 717 or MIL-STD-1553 bus channels on an aircraft, independently or simultaneously, to a tablet computing device.

10. The software developer's kit according to claim 1 where the avionics interface module is connected to an electronic tablet being an Apple iPad or other tablet computing device.

11. The software developer's kit according to claim 1 where applications are hosted on an Apple iPad or other tablet computing device can further utilize the data streaming from the avionics interface module via interpretation from a software developers kit, according to claim 7.

12. The software developer's kit according to claim 1, where applications hosted on a table can further utilize aircraft position data plus other data including, but not limited to, airspeed, heading, course, time/distance/bearing to waypoint plus fuel utilization, and flight plan information.

13. The aerospace grade data conversion system according to claim 1, further comprising a mounting system with an enclosure system that protects the electronic tablet, and a base that is attached to the enclosure and provides an electromechanical interface to the aircraft, its avionics systems and/or power distribution system, and provides physical mechanical security that allows for pivoting, adjusting, loosening, and tightening via an articulating pivot contained within an upper and lower adapter plate which dampens the effects of vibrations inside a cockpit.

14. The enclosure system according to claim 13, with an articulating pivot point allows up to 360° articulation in the vertical axis and up to 115° of rotation in the longitudinal and lateral axes.

15. The enclosure system according to claim 13, where the enclosure system fits around the electronic tablet and secures the electronic table to the mounting system.

16. The base according to claim 13, where, the base mechanically attaches to the aircraft or the pilots knee via straps.

17. The base according to claim 13, further comprising, a hard-point mount that the enclosure can be attached comprising a pedtray, or aircraft interface clamp, a bushing, a clamp nut and an adapter plate.

18. The base according to claim 13, further comprising, a moveable adjustment handle.

19. The base according to claim 13, where the adjustment handles allows for adjusting the viewing angle of the electronic tablet.

20. The base according to claim 13, further comprising, a top tension plate and a bottom tension plate and a clamp nut.

21. The base according to claim 13, where the top tension plate can be tightened in order to prevent the enclosure from moving or vibrating relative to the base.

22. The base according to claim 13, where the clamp nut can be loosened to remove the pedtray from the base in order to forward fit form factors of Apple iPad or other tablet computing devices.

23. The base according to claim 13, where the pedtray attaches to the pedtray or aircraft interface clamp.

24. The base according to claim 13, where the pedtray and the pedtray or aircraft interface clamp are secured together by a bushing or mechanical interlock and secured to the adapter plate.

25. The base according to claim 13, where the adapter plate secures the enclosure.

* * * * *